United States Patent
Betting

(10) Patent No.: US 8,800,599 B2
(45) Date of Patent: Aug. 12, 2014

(54) THROTTLING VALVE AND METHOD FOR ENLARGING LIQUID DROPLET SIZES IN THE THROTTLED FLUID STREAM

(75) Inventor: Marco Betting, Rijswijk (NL)

(73) Assignee: Twister B.V. (NL)

( * ) Notice: Subject to any disclaimer, the term of this patent is extended or adjusted under 35 U.S.C. 154(b) by 1301 days.

(21) Appl. No.: 11/794,434

(22) PCT Filed: Dec. 29, 2005

(86) PCT No.: PCT/EP2005/057219
§ 371 (c)(1),
(2), (4) Date: Oct. 1, 2007

(87) PCT Pub. No.: WO2006/070020
PCT Pub. Date: Jul. 6, 2006

(65) Prior Publication Data
US 2008/0173363 A1    Jul. 24, 2008

(30) Foreign Application Priority Data
Dec. 30, 2004    (EP) .................................... 04107064

(51) Int. Cl.
*F16K 47/14*    (2006.01)
(52) U.S. Cl.
USPC ........................ 137/625.38; 137/813; 137/219
(58) Field of Classification Search
CPC ............. F25J 2205/10; B01D 17/0217; B01D 17/045; F15C 1/16; F15D 1/0015; F16K 47/08; F16K 47/14; F16K 1/126; F16K 1/12; F16K 1/123
USPC ............ 137/219–222, 808, 812, 813, 625.38
See application file for complete search history.

(56) References Cited

U.S. PATENT DOCUMENTS

| | | | | |
|---|---|---|---|---|
| 1,465,916 A | * | 8/1923 | Larner | 137/222 |
| 3,990,475 A | * | 11/1976 | Myers | 137/625.3 |
| 4,024,891 A | * | 5/1977 | Engel et al. | 137/625.3 |
| 4,055,961 A | | 11/1977 | Admiraal | 62/54 |
| 4,375,821 A | * | 3/1983 | Nanao | 137/239 |
| 4,384,592 A | | 5/1983 | Ng | 37/625.37 |
| 4,544,390 A | | 10/1985 | Traficante | 62/20 |
| 4,671,321 A | | 6/1987 | Paetzel et al. | 137/625.3 |
| 5,442,924 A | | 8/1995 | Tsai et al. | 62/15 |
| 6,513,345 B1 | | 2/2003 | Betting et al. | 62/637 |
| 6,730,236 B2 | * | 5/2004 | Kouba | 210/806 |

FOREIGN PATENT DOCUMENTS

| | | | |
|---|---|---|---|
| FR | 778928 | 3/1935 | |
| WO | WO03055575 | 7/2003 | ............. B01D 45/16 |
| WO | WO2004001260 | 12/2003 | ................ F16K 3/26 |
| WO | WO2004083691 | 9/2004 | ............... F16J 15/16 |

* cited by examiner

Primary Examiner — Craig Schneider
(74) Attorney, Agent, or Firm — Meyer IP Law Group

(57) ABSTRACT

A Joule-Thompson or other throttling valve comprises an outlet channel (7) in which swirl imparting means (10) impose a swirling motion to the cooled fluid stream discharged by the valve, thereby inducing liquid droplets to swirl towards the outer periphery (7A) of the fluid outlet channel (7) and to coalesce into enlarged liquid droplets (17) which can be separated easily from a gaseous or other carrier fluid.

23 Claims, 2 Drawing Sheets

US 8,800,599 B2

Figure 1A:
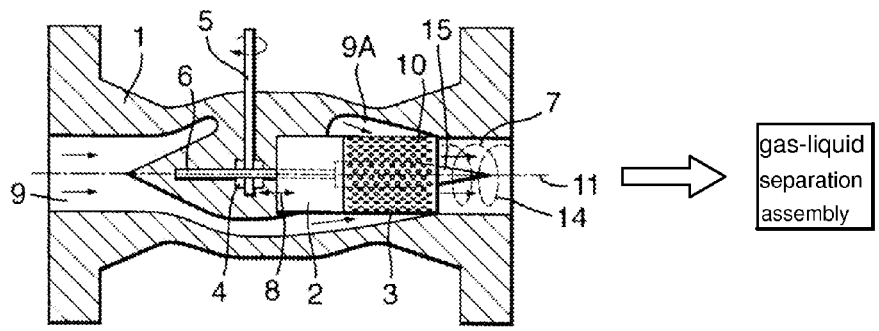
Figure 1B:
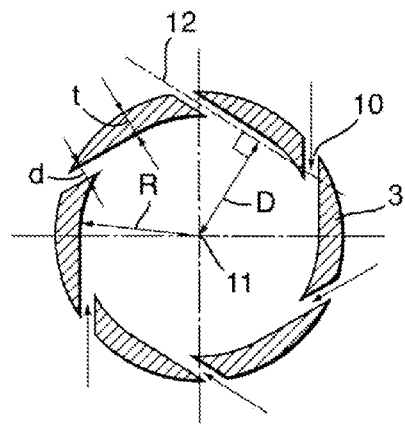
Figure 1C:
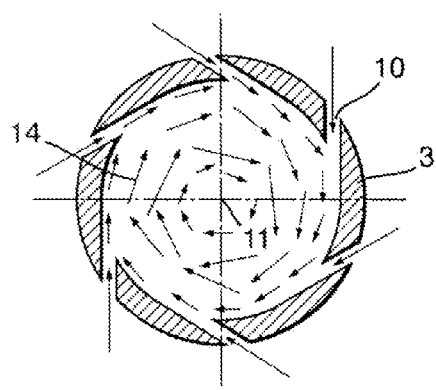

THROTTLING VALVE AND METHOD FOR ENLARGING LIQUID DROPLET SIZES IN THE THROTTLED FLUID STREAM

PRIORITY CLAIM

The present application claims priority from European Patent Application 04107064.0 filed 30 Dec. 2004.

FIELD OF THE INVENTION

The invention relates to a throttling valve and a method for enlarging liquid droplet sizes in a fluid stream flowing through a throttling valve.

BACKGROUND OF THE INVENTION

In the oil & gas industry control valves are used to control pressure, level, temperature and flow. In some cases these control valves operate at choked or throttled conditions, once sufficient pressure drop is created over the control valve. In processing natural gas this pressure reduction over a valve causes the temperature to drop without extracting heat or work from the gas. This so called isenthalpic expansion process is also known as Joule-Thompson (JT) cooling. The valve creating this pressure reduction is called a JT valve. The cooling effect over a JT valve is used to condense a part of the natural gas stream, such that the liquefied fraction can be separated in a vessel. For the majority of these separator vessels the driving force is either inertia or gravity forces or in other words the masses of the liquefied drops determine the efficiency of the separation. Such a Low Temperature Separator preceded by a JT valve is normally referred to as a JT-LTS system.

Even though the prime function of a JT valve is flow rate control, it is often forgotten that the second function is to create a separable liquid phase. In the gas processing industry the mean droplet size resulting from an isenthalpic expansion over a JT valve is unknown, hence the separation efficiency of downstream separators is to a large extent unknown. From time to time gas quality problems do occur due to suboptimal separation efficiency. In those cases it is often the hydrocarbon dew point, which remains too high, which indicates that especially hydrocarbon droplets tend to be too small.

International patent application WO 2004/001260 and U.S. Pat. Nos. 4,384,592 and 4,671,321 disclose throttle valves that are equipped with swirl imparting means that generate vortices in the fluid flux passing through the valve.

The valves known from U.S. Pat. Nos. 4,383,592 and 4,671,321 are provided with perforated sleeves in which the perforations have different orientations relative to a central axis of the sleeve, such that a plurality of vortices are generated in the fluid flux passing through the valve, which vortices may be counter-rotating and serve as noise dampeners.

The valve known from International patent application WO2004/001260 is provided with a valve stem that defines a fluidic vortex chamber with both tangential and non-tangential inlets. If the valve is fully open or nearly fully open fluid flows solely through the tangential inlets, without generating a swirl in the fluid flux. If the valve is nearly closed then fluid flows solely through the non-tangential inlets, thereby generating a vortex and resistance to flow, and suppressing erosive and cavitational wear of the valve mechanism.

U.S. Pat. Nos. 4,055,961 and 4,544,390 and International patent application WO2004083691 disclose throttling valves in which gaseous components are condensed as a result of the Joule Thompson effect.

A problem with the known Joule Thomson and other throttling valves is that the size of the condensed liquid droplets is generally small, such that a mist flow is generated from which the liquid and gaseous phases cannot be easily separated.

In an embodiment of the present invention this problem is solved. A throttling valve in which larger liquid droplets can be formed than in the known throttling valves is provided in some embodiments of the present invention.

SUMMARY OF THE INVENTION

In accordance with the invention there is provided a throttling valve having a housing, a valve body which is movably arranged in the housing to control the flux of a fluid stream flowing from a fluid inlet channel into a fluid outlet channel of the valve such that the fluid stream is expanded and cooled, and swirl imparting means which imposes a swirling motion to the fluid stream flowing through the fluid outlet channel; wherein the swirl imparting means are oriented such that if the valve is fully opened the fluid stream swirls about a longitudinal axis of the fluid outlet channel thereby inducing liquid droplets that are formed during the expansion along the flow path of the valve to swirl towards the outer periphery of the fluid outlet channel and to coalesce.

The throttling valve optionally comprises a substantially conical central body which is arranged in the fluid outlet channel and which is substantially co-axial to a central axis of the fluid outlet channel and which generates a fluid outlet channel having a gradually increasing cross-sectional area in downstream direction, thereby generating a vortex with a swirl factor that promotes growth and coalescence of condensed fluid droplets.

The valve may further comprise a perforated sleeve via which fluid flows from the fluid inlet channel into the fluid outlet channel if in use the valve body permits fluid to flow from the fluid inlet channel into the fluid outlet channel, and the swirl imparting means are provided by longitudinally and circumferentially spaced perforations of the sleeve which have an at least partially tangential orientation relative to a longitudinal axis of the sleeve, such that in use the fluid stream is induced to swirl about the longitudinal axis of the fluid outlet channel.

At least some perforations may have a central axis, which crosses a longitudinal axis of the sleeve at a selected distance D and at a selected acute angle between 0 and 90 degrees and the inner surface of the perforated sleeve may be located at a radius R from the longitudinal axis of the sleeve such that the ratio between the distance D and the radius R is between 0.2 and 1, preferably between 0.5 and 0.99.

The valve may be a Joule Thompson valve having a substantially tubular fluid outlet channel and a valve body comprising a piston which is movable in a substantially longitudinal direction through the fluid outlet channel and the perforated sleeve may be secured to the piston such that a substantially annular downstream end of the fluid inlet channel at least partially surrounds the perforated sleeve and at least some fluid is induced to flow from the fluid inlet channel via non-radial perforations in the perforated sleeve into the fluid outlet channel when the valve body is in a fully open position.

In accordance with some embodiments of the invention there is also provided a method for enlarging droplet sizes in a multiphase fluid stream comprising liquid droplets and a carrier fluid flowing through an outlet section of a throttling valve, wherein swirl imparting means imposes a swirling motion to the fluid stream flowing through the fluid outlet channel; wherein the available free pressure in the throttling valve is used for isenthalpic expansion and to create a swirling flow in the fluid stream flowing through the outlet channel of the valve thereby inducing liquid droplets to swirl towards the outer periphery of the fluid outlet channel and to coalesce into enlarged liquid droplets.

The fluid could be either 1) a pre-dominantly gaseous carrier with a liquid phase or 2) a predominantly liquid carrier with an immiscible liquid and/or gaseous phase. An example of option 1) is a low temperature separation (LTS) process with a JT-valve fed by a natural gas stream with liquid fraction of condensates, water and glycol. An example of option 2) is a condensate stabilization process with a throttling valve fed by a condensate stream with liquid fraction of water and/or glycol.

These and other features, objects and advantages of the throttling valve and method according to the present invention will become apparent from the accompanying claims, abstract and detailed description of an embodiment of the throttling valve according to the present invention in which reference is made to the accompanying drawings.

BRIEF DESCRIPTION OF THE DRAWINGS

FIG. 1A depicts a longitudinal sectional view of a throttling valve according to the invention;

FIG. 1B depicts at an enlarged scale a cross-sectional view of the outlet channel of the throttling valve of FIG. 1A;

FIG. 1C illustrates the swirling motion of the fluid stream in the outlet channel of the throttling valve of FIGS. 1A and 1B;

FIG. 1D illustrates the concentration of liquid droplets in the outer periphery of the outlet channel of the throttling valve of FIGS. 1A and 1B;

FIG. 2A depicts a longitudinal sectional view of conventional throttling valve;

FIG. 2B depicts at an enlarged scale a cross-sectional view of the outlet channel of the throttling valve of FIG. 2A;

FIG. 2C illustrates the erratic motion of the fluid stream in the outlet channel of the conventional valve of FIGS. 2A and 2B; and FIG. 2D illustrates the uniform mist flow with small liquid droplets in the outlet channel of the conventional throttling valve of FIGS. 2A and 2B.

DETAILED DESCRIPTION OF AN EMBODIMENT OF THE INVENTION

An embodiment of the throttling valve according to present invention shown in FIG. 1A-1D has a valve geometry able to enhance the coalescence process of droplets formed during the expansion along the flow path of a Joule-Thomson or other throttling valve. These larger droplets are better separable than would be the case in traditional Joule-Thomson or other throttling valves.

The valve shown in FIG. 1A comprises a valve housing 1 in which a piston-type valve body 2 and associated perforated sleeve 3 are slideably arranged such that by rotation of a gear wheel 4 at a valve shaft 5 a teethed piston rod 6 pushes the piston type valve body up and down into a fluid outlet channel 7 as illustrated by arrow 8. The valve has an fluid inlet channel 9 which has an annular downstream section 9A that may surround the piston 2 and/or perforated sleeve 3 and the flux of fluid which is permitted to flow from the fluid inlet channel 9 into the fluid outlet channel 7 is controlled by the axial position of the piston-type valve body 2 and associated perforated sleeve 3. The valve furthermore comprises a conical central body 15 which is substantially co-axial to a central axis 11 of the fluid outlet channel 7 and which generates an outlet channel 7 having a gradually increasing cross-sectional area in downstream direction, thereby generating a controlled deceleration of the fluid flux in the outlet channel 7 and a vortex with a swirl factor that promotes growth and coalescence of condensed fluid droplets.

FIG. 1B illustrates that in a throttling valve wherein the perforated sleeve 3 comprises tilted or non-radial perforations 10, that are drilled in a selected partially tangential orientation relative to a central axis 11 of the fluid outlet channel 7 such that the longitudinal axis 12 of each of the perforations 10 crosses the central axis 11 at a distance D, which is between 0.2 and 1, preferably between 0.5 and 0.99 times the internal radius R of the sleeve 3.

The tilted perforations 10 create a swirling flow in the fluid stream flowing through the fluid outlet channel 7 as illustrated by arrow 14. The swirling motion may also be imposed by a specific geometry of the valve trim and/or valve stem. In this valve the available free pressure is used for isenthalpic expansion to create a swirling flow in the fluid stream. The kinetic energy is then mainly dissipated through dampening of the vortex along an extended pipe length downstream the valve.

FIGS. 1C and 1D illustrate that an advantage of creating a swirling flow in the outlet channel of the valve is twofold:

1. Regular velocity pattern->less interfacial shear->less droplet break-up->larger drops
2. Concentration of droplets in the outer circumference 7A of the flow area of the fluid outlet channel 7->large number density->improved coalescence->larger drops 18. Although any Joule-Thomson or other choke and/or throttling type valve would be suitable to create a swirling flow, a choke-type throttling valve as supplied by Mokveld Valves B.V. and disclosed in their International patent application WO2004083691 may be utilized.

FIG. 2A-2D illustrate a traditional cage-valve for flow control service a supplied by Mokveld Valves B.V. in which the flux of fluid is throttled over a perforated sleeve 23, which is connected to a piston-type valve body 22.

The conventional Mokveld throttling valve shown in FIG. 2A comprises a valve housing 21 in which a piston-type valve body 22 and associated perforated sleeve 23 are slideably arranged such that by rotation of a gear wheel 24 at a valve shaft 25 a teethed piston rod 26 pushes the piston type valve body up and down into a fluid outlet channel 27 as illustrated by arrow 28. The valve has an fluid inlet channel 29 which has an annular downstream section 29A that may surround the piston 22 and/or perforated sleeve 23 and the flux of fluid which is permitted to flow from the fluid inlet channel 29 into the fluid outlet channel 27 is controlled by the axial position of the piston-type valve body 22 and associated perforated sleeve 23.

The conventional sleeve 23 comprises perforations 30—slots or holes—that have a radial orientation i.e. rectangular to the cylindrical surface of the sleeve 23. By displacing the piston 22 and sleeve 23 in axial direction the flow area can be controlled.

As illustrated in FIG. 2C the flow pattern in a cage valve with radial openings is highly disordered, hence introducing high shear forces causing droplets to break up into smaller droplets.

Calculations Which Illustrate Effect of Swirling Flow on Droplet Size

The following calculations illustrate the effect of a swirling motion of the mist flow in the fluid outlet channel 7 on the coalescence and growth of liquid droplets.

The calculations are made by example only and do not limit the method and throttling valve according to the present invention to the application of any scientific theory.

Presumed that the valve operates at choked conditions, the average tangential entrance velocity ($U_{tan}$) of the fluid will be close to 150 m/s. For a typical cage diameter (D) of 80 mm the vortex strength $\Gamma$ would be:

$$\Gamma = \pi D U_{tan} = 38 \text{ m}^2/\text{s} \qquad \text{Equation 1}$$

To determine at which radial position a droplet of diameter (d=1 um) with density ($\rho_L$=650 kg/m$^3$) will rotate in a swirl of gaseous fluid with density ($\rho_G$=60 kg/m$^3$), viscosity ($v$=2.10$^{-7}$ m$^2$/s) and sink strength (Q=4 m$^2$/s), the following expression is used:

$$R_{eq} = \frac{\Gamma}{\sqrt{Q}} \cdot \sqrt{2 \cdot \pi \cdot \frac{2}{9} \cdot \frac{d^2}{4\pi^2 \cdot v} \cdot \left(\frac{\rho_L}{\rho_G} - 1\right)} = 25 \text{ mm} \qquad \text{Equation 2}$$

On the assumption that >>99% of all liquid mass is represented by droplets of d≥1 um then this mass is concentrated in the flow area outside the radius $R_{eq}$=25 mm. The flow area in the cage outside $R_{eq}$=25 mm represents 61% of the total cross sectional flow area. The droplet number density (N) is now increased with a factor 1.67 compared to a non-swirling flow.

The basic formula for the number of collisions between droplets of the same size is, according Chesters:

$$N_{col} = -\frac{dN}{dt} = \frac{k_1}{2} u_{rel} d^2 N^2 \qquad \text{Equation 3}$$

In equation 3
$N_{col}$=the number of collisions that occur per second and per m$^3$
N=the number of droplets present per m$^Y$
$u_{rel}$=the relative velocity between the droplets
d=the droplet diameter=2r (the radius)
$k_1$=a constant of order 1

Since N in a swirling flow is increased with a factor 1.67, the droplet collision rate increases with a factor 1.67$^2$=2.8.

The relative velocity ($u_{rel}$) between droplets is determined with:
1. Brownian motion
2. Turbulent motion
3. Centrifugal drift motion For coalescence the droplet size range of interest is 1≤d≤5 um. For this size range the relative velocity is dominated by turbulent motion. Brownian motion can be neglected since molecular impingement will not influence droplets of 1 µm. Although centrifugal drift motion enhances relative droplet motion in swirling flows, it is still neglected as turbulence is the more dominant driver.

The coalescence efficiency can be expressed as the time in which a droplet multiplies its size. A droplet of d=1 micron is not separable in normal gravity or centrifugal separators. To become separable a factor 5 increase in droplet diameter is minimal required. In order to get a factor 5 increase in droplet diameter, 5$^3$=125 collisions have to occur. Therefore the minimum required retention time to let one drop collide 125 times with other drops ($t_{125}$) is defined in the table below. These equations for coalescence time scales only account for turbulent motion as driving force.

TABLE 1

Coalescence time scales for swirling and non-swirling flow

| | No swirl | Swirl |
|---|---|---|
| $t_{125} = \dfrac{248}{b_{eff} N_0}$ Minimum required retention time to create 5 times larger droplet by coalescence | 2.7 sec | 0.2 sec |
| $b_{eff} = Cd^3 \sqrt{\dfrac{\varepsilon}{v}}$ | 9.192 * 10$^{-13}$ | 6.5 * 10$^{-12}$ |
| Number density at $t_0$ ($N_0$) | 1 * 10$^{14}$ m$^{-3}$ | 1.67 * 10$^{14}$ m$^{-3}$ |
| Droplet diameter (d) | 1 µm | 1 µm |
| Turbulent dissipation ($\varepsilon$) | 1.10$^5$ m$^2$/s$^3$ | 5.10$^6$ m$^2$/s$^3$ |
| Kinematic viscosity (v) | 2.10$^{-7}$ m$^2$/s | 2.10$^{-7}$ m$^2$/s |
| Constant (C) (Saffman & Turner) | 1.3 | 1.3 |
| Required length scale ($L_{125}$) (axial velocity = 10 m/s) | 27 m | 2 m |

A first order approximation of the effect of swirling flow on droplet coalescence, shows a major improvement of the coalescence rate due to flow turbulence. Enlarging droplets with a factor 5—so that these becomes separable in a conventional separator vessel—requires a typical length scale of 2 meters for a swirling flow compared to 27 meters for a non-swirling flow.

Figure 1D:
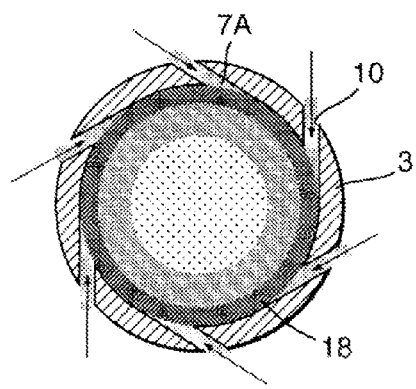
Figure 2A:
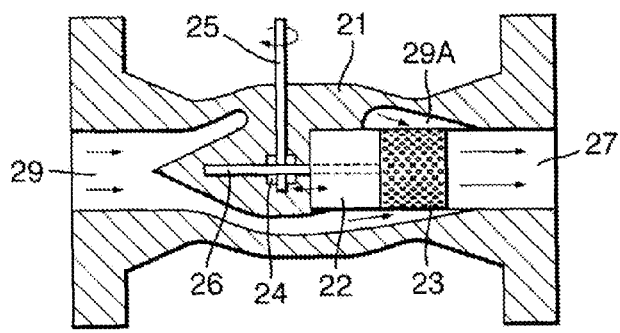
Figure 2B:
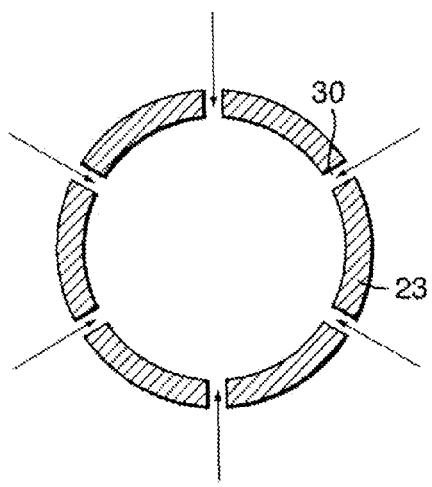
Figure 2C:
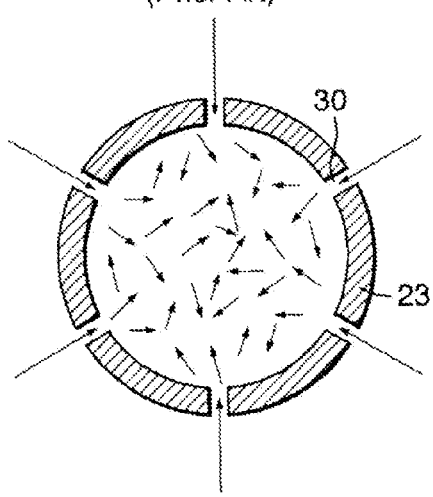
Figure 2D:
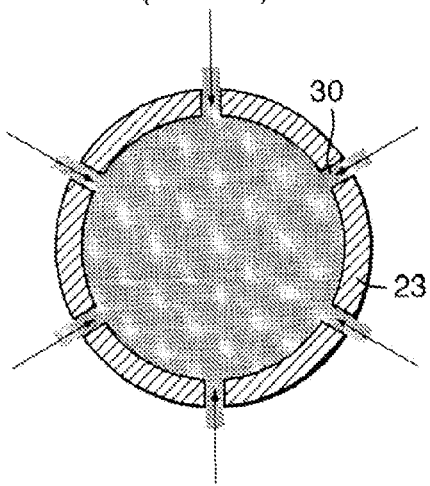

As illustrated in FIG. 1D the presence of a swirling motion in the throttling valve concentrates the droplets 18 in a reduced flow area 7A at the outer boundary (61% of total) of the fluid outlet channel 7, such that the droplet number density increases with a factor of circa 1.67. Furthermore the rate of turbulent dissipation in de vortex core is large because of the high tangential velocity.

It will be understood that the creation of large liquid droplets in the outlet channel 7 of the throttling valve will make it easier to separate the liquid and gaseous phase in a fluid separation assembly that may be arranged downstream of the throttling valve. Such a subsequent fluid separation assembly may comprise one or more gravity and/or cyclonic separation vessels.

The fluid could be either 1) a pre-dominantly gaseous carrier with a liquid phase or 2) a predominantly liquid carrier with an immiscible liquid and/or gaseous phase. An example of option 1) is a LTS process with a JT-valve fed by a natural gas stream with liquid fraction of condensates, water and glycol. An example of option 2) is a condensate stabilization process with a throttling valve fed by a condensate stream with liquid fraction of water and/or glycol.

What is claimed is:
1. A throttling valve comprising:
a housing;
a valve body which is arranged in the housing;
a perforated sleeve via which the valve body permits the multiphase fluid to flow from a fluid inlet channel into a fluid outlet channel, wherein the multiphase fluid stream is in a straight flow upstream of the perforated sleeve;
wherein the valve body and the perforated sleeve are slidably arranged in the housing such that the valve body controls multiphase fluid flow from a fluid inlet channel into the fluid outlet channel of the valve; and
wherein at least some perforations of the sleeve have an at least partially tangential orientation relative to a longitudinal axis of the sleeve, such that the multiphase fluid is expanded and converted into a multiphase fluid stream, which is induced to swirl within the fluid outlet channel and liquid droplets are induced to swirl towards the outer periphery of the fluid outlet channel and to coalesce into enlarged liquid droplets, wherein the valve is such that the multiphase fluid stream is non-swirling until it is induced to swirl.

2. The throttling valve of claim 1, wherein a gas-liquid separation assembly is connected to the outlet channel of the choke valve, in which assembly liquid and gaseous phases of the multiphase fluid stream discharged by the valve are at least partly separated.

3. The throttling valve of claim 1, wherein the multiphase fluid stream comprises hydrocarbon and aqueous fluids and wherein at least a fraction of the aqueous fluids is converted into liquid water droplets which are induced to swirl towards the outer periphery of the fluid outlet channel and to coalesce into enlarged water droplets and/or an annular water film at the outer periphery of the fluid outlet channel.

4. The throttling valve of claim 1, wherein the multiphase fluid stream comprises a gaseous carrier fluid and the fluid inlet and/or fluid outlet channel and/or other parts of the interior of the throttling valve provides a fluid channel in which the fluid stream is accelerated and is thereby induced to be expanded and cooled by means of the Joule Thomson effect.

5. A throttling valve comprising:
a housing;
a valve body which is arranged in the housing; and
a swirl imparter which imposes a swirling motion to a fluid stream flowing through a fluid outlet channel,
wherein the valve body and the swirl imparter are slidably arranged in the housing such that they can be moved into the fluid outlet channel to control the flux of a fluid stream flowing from a fluid inlet channel into a fluid outlet channel of the valve such that the fluid stream is expanded and cooled,
wherein the swirl imparter is provided by longitudinally evenly-spaced perforations and circumferentially evenly-spaced perforations of a perforated sleeve, via which the valve body permits the fluid stream to flow from the fluid inlet channel into the fluid outlet channel, and
wherein the swirl imparter is oriented such that the fluid stream swirls about a longitudinal axis of the fluid outlet channel, thereby inducing liquid droplets that are formed during the expansion along the flow path of the valve to swirl towards the outer periphery of the fluid outlet channel and to coalesce, wherein the valve is such that the fluid stream is non-swirling until it reaches the swirl imparter.

6. The throttling valve of claim 5, wherein a substantially conical central body is arranged in the fluid outlet channel, which body is substantially co-axial to a central axis of the fluid outlet channel and which generates an outlet channel having a gradually increasing cross-sectional area in downstream direction, thereby generating a vortex with a swirl factor that promotes growth and coalescence of condensed fluid droplets.

7. The throttling valve of claim 5, wherein the valve is a Joule Thompson valve having a substantially tubular fluid outlet channel and a valve body comprising a piston which is movable in a substantially longitudinal direction through the fluid outlet channel and wherein the perforated sleeve is secured to the piston such that a substantially annular downstream end of the fluid inlet channel at least partially surrounds the perforated sleeve and at least some fluid is induced to flow from the fluid inlet channel via non-radial perforations in the perforated sleeve into the fluid outlet channel when the valve body is in a fully open position.

8. System for separating a liquid and gaseous phase in a fluid separation assembly, comprising a throttling valve according to claim 5, and a fluid separation assembly that is arranged downstream of the throttling valve.

9. The throttling valve of claim 5, wherein the valve further comprises:
a substantially conical central body that is arranged downstream of the perforated sleeve in the fluid outlet channel, which body is substantially co-axial to a central axis of the fluid outlet channel and which generates an outlet channel having a gradually increasing cross-sectional area in downstream direction, thereby generating a vortex with a swirl factor that promotes growth and coalescence of condensed fluid droplets.

10. The throttling valve of claim 5, wherein the valve further comprises:
a valve shaft, wherein by rotation of a gear wheel at the valve shaft a teethed piston rod pushes the valve body up and down into the fluid outlet channel to control the flow of the fluid stream from the fluid inlet channel into the fluid outlet channel.

11. The throttling valve of claim 5, wherein:
the flow inlet channel and the flow outlet channel are aligned along a same central axis line.

12. The throttling valve of claim 5, wherein the fluid inlet channel operates to accelerate the fluid stream and thereby induces the fluid stream to be expanded and cooled by means of the Joule Thomson effect.

13. The throttling valve of claim 5, wherein:
the fluid stream is comprised of gaseous fluid that can be expanded and cooled.

14. The throttling valve of claim 5, wherein evenly-spaced perforations of the perforated sleeve have an at least partially tangential orientation relative to a longitudinal axis of the sleeve, such that the fluid stream is induced to swirl about the longitudinal axis of the fluid outlet channel.

15. The throttling valve of claim 14, wherein at least some perforations have a central axis, which positions relatively to a longitudinal axis of the sleeve at a selected distance D and at a selected acute angle along the flow direction.

16. The throttling valve of claim 15, wherein the inner surface of the perforated sleeve is located at a radius R from the longitudinal axis of the sleeve and the ratio between the distance D and the radius R is between 0.2 and 1.

17. The throttling valve of claim 16, wherein the ratio between the distance D and the radius R is between 0.5 and 0.99.

18. A method for enlarging droplet sizes in a multiphase fluid stream comprising the steps of:
flowing liquid droplets and a carrier fluid in the multiphase fluid stream through a perforated sleeve into an outlet section of a throttling valve which comprises a housing, a valve body and the perforated sleeve with the valve body and the perforated sleeve being slidably arranged in the housing, wherein the multiphase fluid stream is in a straight flow upstream of the perforated sleeve;
using available free pressure in the throttling valve for isenthalpic expansion; and
creating a swirling flow in the fluid stream flowing through the outlet channel of the valve thereby inducing liquid droplets to swirl towards the outer periphery of the fluid outlet channel and to coalesce, wherein a swirl imparter is provided by longitudinally evenly-spaced perforations and circumferentially evenly-spaced perforations of the perforated sleeve, wherein the swirl imparter is oriented such that the fluid stream swirls about a longitudinal axis of the fluid outlet channel.

19. The method of claim 18, wherein a gas-liquid separation assembly is connected to the outlet channel of the choke valve, in which assembly liquid and gaseous phases of the multiphase fluid stream discharged by the valve are at least partly separated.

20. The method of claim 18, wherein the multiphase fluid stream comprises hydrocarbon and aqueous fluids and wherein at least a fraction of the aqueous fluids is converted into liquid water droplets which are induced to swirl towards the outer periphery of the fluid outlet channel and to coalesce into enlarged water droplets and/or an annular water film at the outer periphery of the fluid outlet channel.

21. The method of claim 18, wherein the multiphase fluid stream comprises a gaseous carrier fluid and the fluid inlet and/or fluid outlet channel and/or other parts of the interior of the throttling valve provides a fluid channel in which the fluid stream is accelerated and is thereby induced to be expanded and cooled by means of the Joule Thomson effect.

22. The method of claim 21, wherein the multiphase fluid stream is expanded to a transonic or supersonic velocity.

23. Method for separating a liquid and gaseous phase in a fluid separation assembly, comprising:
  performing the method for enlarging droplet sizes in accordance with claim 18, using a throttling valve; and
  performing separation using a fluid separation assembly arranged downstream of the throttling valve.

* * * * *